(12) United States Patent
Sambuichi et al.

(10) Patent No.: US 10,566,871 B2
(45) Date of Patent: Feb. 18, 2020

(54) MOTOR AND METHOD OF MANUFACTURING THE SAME

(71) Applicant: Nidec Corporation, Minami-ku, Kyoto (JP)

(72) Inventors: Hiroshi Sambuichi, Minami-ku Kyoto (JP); Kosuke Ogawa, Minami-ku Kyoto (JP); Takashi Hattori, Minami-ku Kyoto (JP)

(73) Assignee: NIDEC CORPORATION, Minami-Ku, Kyoto (JP)

( * ) Notice: Subject to any disclaimer, the term of this patent is extended or adjusted under 35 U.S.C. 154(b) by 2 days.

(21) Appl. No.: 16/031,474

(22) Filed: Jul. 10, 2018

(65) Prior Publication Data

US 2018/0323670 A1 Nov. 8, 2018

Related U.S. Application Data

(63) Continuation of application No. 14/980,619, filed on Dec. 28, 2015, now Pat. No. 10,050,483.

(30) Foreign Application Priority Data

Dec. 26, 2014 (JP) .................. 2014-265024

(51) Int. Cl.
*H02K 3/52* (2006.01)
*H02K 3/50* (2006.01)
(Continued)

(52) U.S. Cl.
CPC ............... *H02K 3/28* (2013.01); *H02K 3/38* (2013.01); *H02K 3/522* (2013.01); *H02K 15/0068* (2013.01); *H02K 2203/09* (2013.01)

(58) Field of Classification Search
CPC ............ H02K 3/28; H02K 3/38; H02K 3/522; H02K 15/0068; H02K 2203/09
(Continued)

(56) References Cited

U.S. PATENT DOCUMENTS 6,914,356 B2 7/2005 Yamamura et al.
7,219,417 B2 5/2007 Kobayashi et al.
(Continued)

FOREIGN PATENT DOCUMENTS

JP 2003324883 A 11/2003
JP 2003324887 A 11/2003
(Continued)

OTHER PUBLICATIONS

JPO Notice of Reasons for Refusal corresponding to Application No. 2015-253767; dated Sep. 3, 2019.

*Primary Examiner* — Burton S Mullins
(74) *Attorney, Agent, or Firm* — Cantor Colburn LLP

(57) ABSTRACT

A motor, may include a rotor having a shaft which has its center on a center axis extending in one direction; a stator which surrounds the rotor in the axial circumference, and includes a plurality of coils; and bus bars connecting coil ends extending from the coils. The bus bars may include a plate shape member bent in a thickness direction, a width direction of the bus bars being identical to an axial direction of the motor. Each of the bus bars may include a main body portion, and a coil end connection portion which extends from the main body portion and grips one of the coil ends at an opening that is open toward one direction within a plane perpendicular to the axial direction.

11 Claims, 16 Drawing Sheets

(51) Int. Cl.
*H02K 3/18* (2006.01)
*H02K 3/28* (2006.01)
*H02K 3/38* (2006.01)
*H02K 15/00* (2006.01)

(58) Field of Classification Search
USPC .......................................................... 310/71
See application file for complete search history.

(56) References Cited

U.S. PATENT DOCUMENTS

| | | |
|---|---|---|
| 7,518,853 B2 | 4/2009 | Kato et al. |
| 7,579,729 B2 | 8/2009 | Takashima et al. |
| 7,709,982 B2 | 5/2010 | Ohuchi et al. |
| 8,193,677 B2 | 6/2012 | Murakami et al. |
| 8,816,550 B2 | 8/2014 | Kim |
| 8,878,407 B2 | 11/2014 | Ikura |
| 9,225,217 B2 | 12/2015 | Tomita et al. |
| 9,450,464 B2 | 9/2016 | Tomita et al. |
| 2008/0242124 A1 | 10/2008 | Otsuji et al. |
| 2010/0060090 A1 | 3/2010 | Sakata et al. |
| 2014/0028127 A1* | 1/2014 | Chamberlin ........... H02K 3/522 310/71 |
| 2017/0366060 A1 | 12/2017 | Haberkorn et al. |

FOREIGN PATENT DOCUMENTS

| | | |
|---|---|---|
| JP | 2008187875 A | 8/2008 |
| JP | 2009124926 A | 6/2009 |
| JP | 2009124927 A | 6/2009 |
| JP | 2010011690 A | 1/2010 |
| JP | 2013212008 A | 10/2013 |
| JP | 2014197951 A | 10/2014 |

\* cited by examiner

MOTOR AND METHOD OF MANUFACTURING THE SAME

CROSS REFERENCE TO RELATED APPLICATIONS

This application is a continuation application under 35 U.S.C. § 120 of U.S. patent application Ser. No. 14/980,619, filed Dec. 28, 2015, which is incorporated herein reference and which claimed priority to Japanese Application No. 2014-265024, filed Dec. 26, 2014. The present application likewise claims priority under 35 U.S.C. § 119 to Japanese Application No. 2014-265024, filed Dec. 26, 2014, the entire content of which is also incorporated herein by reference.

FIELD OF THE INVENTION

The present disclosure relates to a motor and a method of manufacturing the same.

BACKGROUND

A motor having a bus bar for wiring a coil end to a convenient location has been known. Japanese Patent No. 3650372 discloses a connection conductor having a coil-connecting terminal portion which is formed by bending a conductive line. The coil-connecting terminal portion of the connection conductor is formed of folded linear conductive lines which protrude radially outward, and the folded linear conductive lines are connected by welding. Japanese Patent Application Publication No. 2010-011690 discloses a connection ring which is formed by overlapping two linear conductors. The connection ring has a connection portion which is connected to a coil end of a stator coil, and the connection portion is connected to the coil by sandwiching the coil end between the two bent linear conductors.

In the connection conductor of Japanese Patent No. 3650372, a phase connection conductor, which is formed by bending conductive wires, is arranged in a connection conductor holder, which has a groove recessed radially outward, such that the coil-connecting terminal portion faces a radially outer side, and in a manufacturing method of the connection conductor, a welding process was required to weld the two neighboring conductive wires so that the conductive wires do not split out, and therefore the manufacturing costs increased. Also, in the connection ring of Japanese Patent Application Publication No. 2010-11690, two linear conductors were required per connection portion so that the connection ring can be formed more conveniently, and therefore the number of required elements and the manufacturing cost both increased.

SUMMARY

A first exemplary embodiment of the present disclosure is a motor which includes a stator which surrounds a rotor about an axis and has a plurality of coils, and a bus bar which is connected to a coil end extended from the coils. The bus bar is formed of a plate shape member bent in a thickness direction, and a width direction of the bus bar is identical to the axial direction. Further, the bus bar has a main body portion, and a coil end connection portion which extends from the main body portion, and grips the coil end at an opening that is open toward one direction within a plane perpendicular to the axial direction.

According to the first exemplary embodiment of the present disclosure, a motor having an inexpensive bus bar is provided. The above and other elements, features, steps, characteristics and advantages of the present disclosure will become more apparent from the following detailed description of the preferred embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Herein, the first exemplary embodiment of the present disclosure will be described in detail with reference to the drawings. In the following description, for the convenience of explanation, the drawings may enlarge a particular portion to emphasize a feature, and a scale, the size, etc., of each structure may be different from those of actual structures. For the same purpose, relatively less characteristic portions may be omitted from the drawings. Some of the drawings illustrate an X-axis, a Y-axis, and a Z-axis as necessary.

Further, herein, descriptions such as being axially extended do not only refer to a case of strictly being extended in the axial direction (Z-axis direction), but it may also include a case of being extended in a direction inclined at less than 45° relative to the axial direction. Also, descriptions such as being radially extended do not only refer to a case of strictly being extended in the radial direction, that is, the direction perpendicular to the axial direction (Z-axis direction), but it may also include a case of being extended in a direction inclined at less than 45° relative to the radial direction.

In the following description, a positive side of the Z-axis direction (+Z side) is defined as 'rear side' and a negative side of the Z-axis direction (−Z side) is defined as 'front side.' It is to be understood that the descriptions of the rear side and the front side are used for explanation only, and they do not limit the actual positional relation or direction. Also, unless otherwise explained, a direction parallel to the center axis J (Z-axis direction) is simply referred to as 'axial direction,' a radial direction having its center on the center axis J is simply referred to as 'radial direction,' and a circumferential direction having its center on the center axis J, that is, the axial circumference of center axis J, is simply referred to as 'circumferential direction.'

Figure 1:
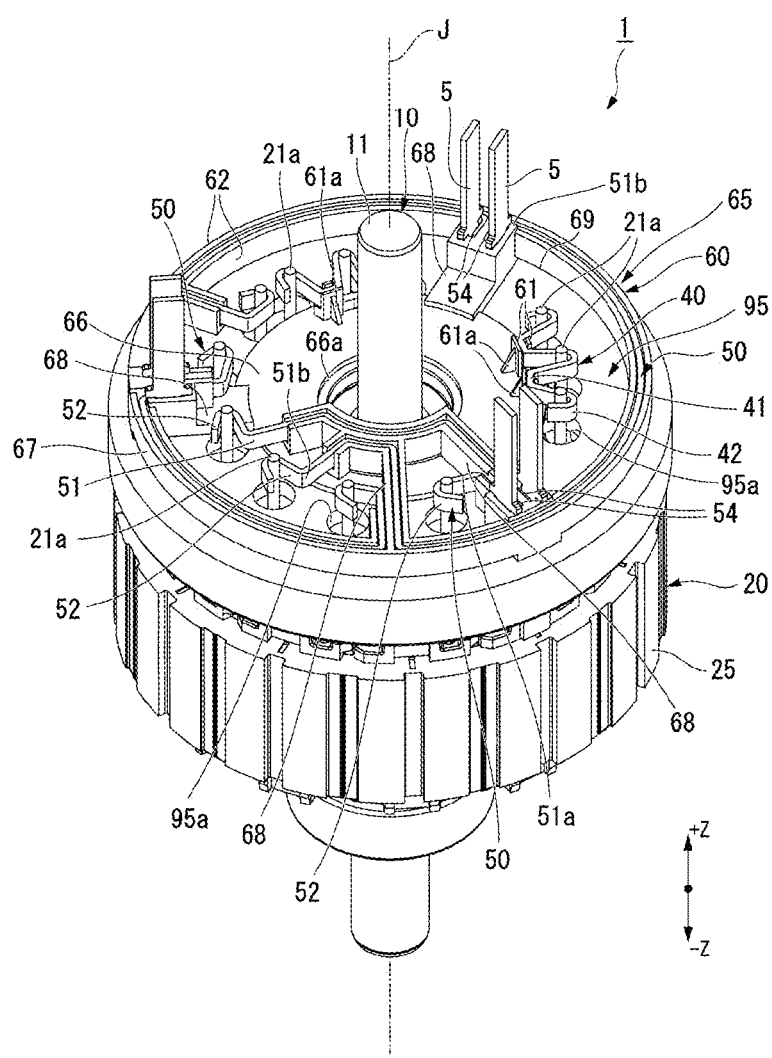
FIG. 1 is a perspective view which illustrates a motor according to a first embodiment.
Figure 2:
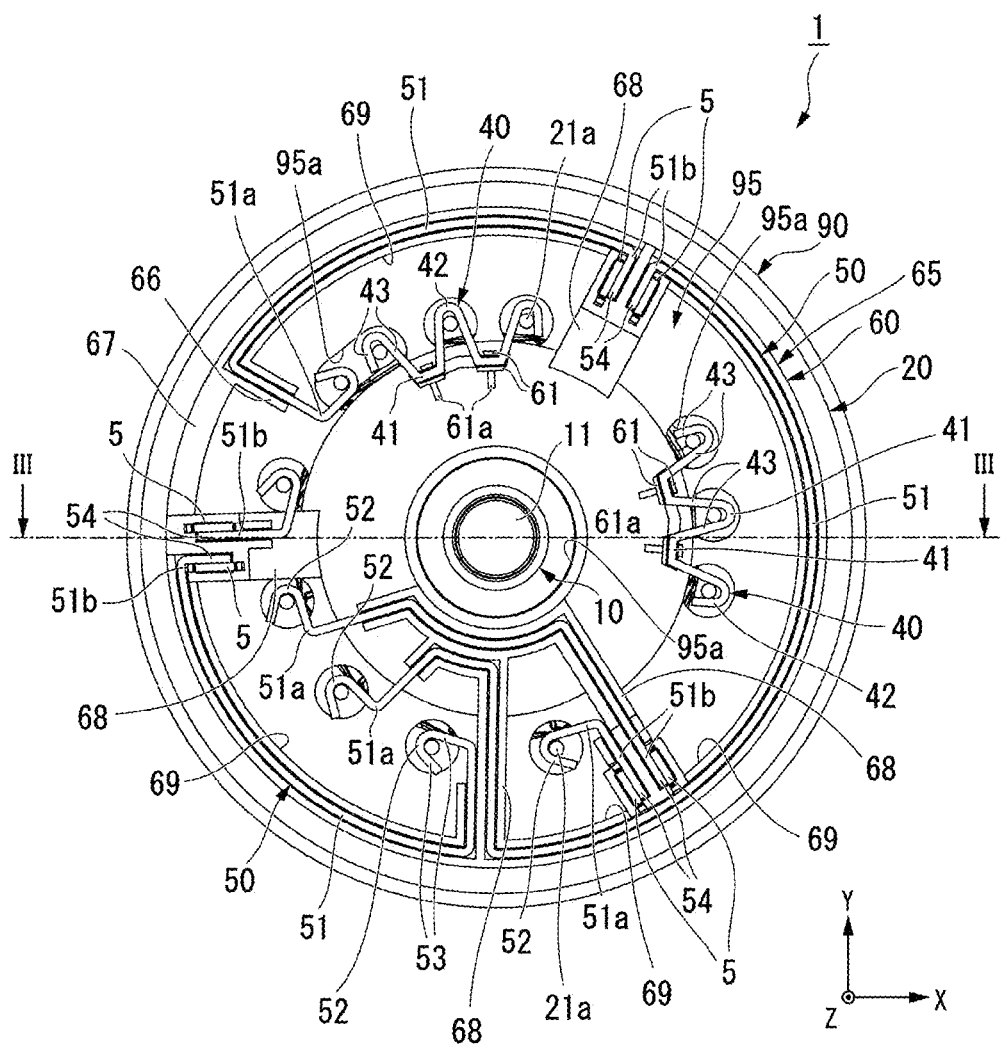
FIG. 2 is a top view of the motor shown in FIG. 1.
Figure 3:
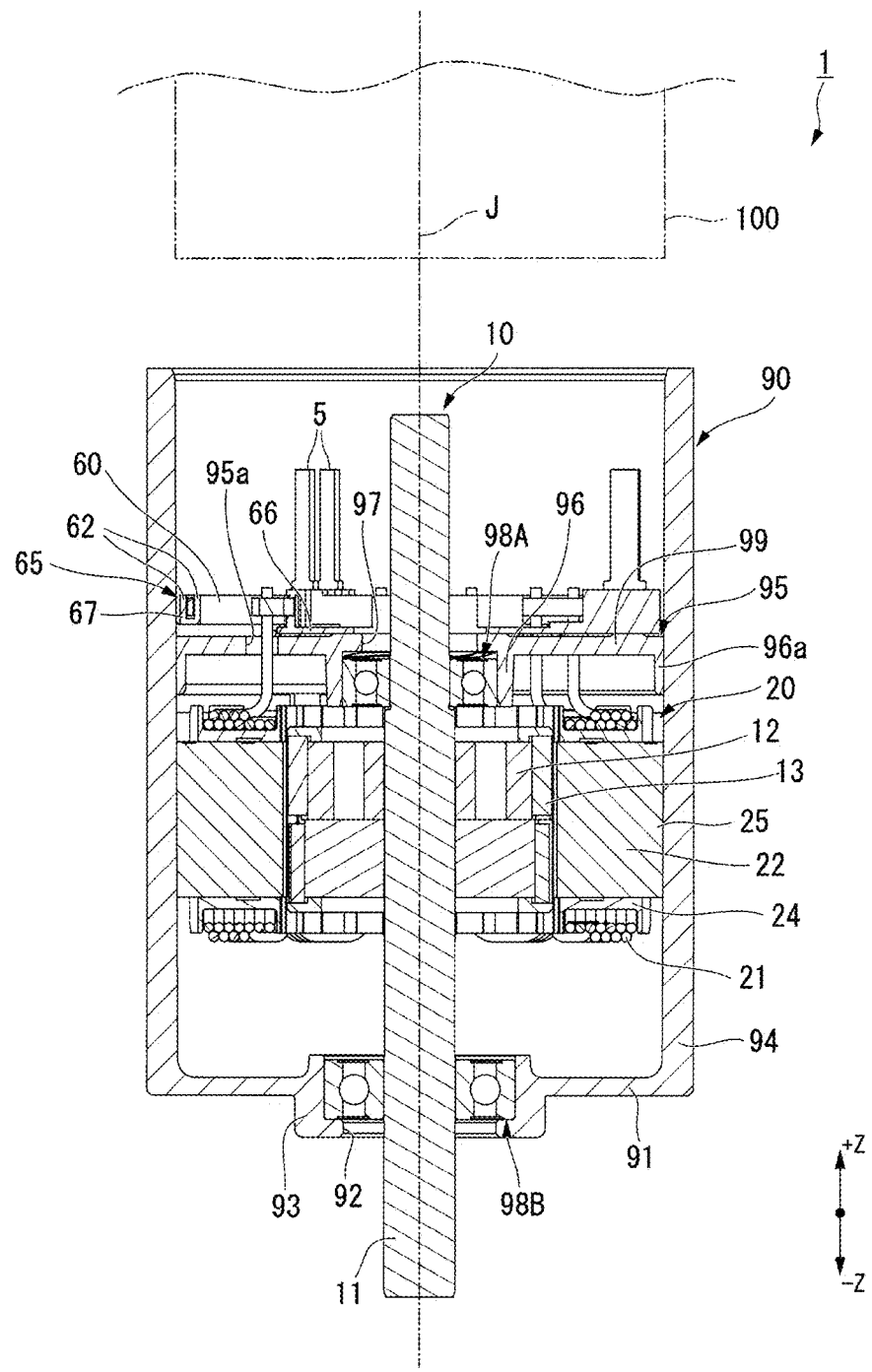
FIG. 3 is a cross-sectional view taken along the line shown in FIG. 2.

FIG. 1 is a perspective view of a motor 1 according to this embodiment. FIG. 2 is a cross-sectional view of the motor 1. FIG. 3 is a cross-sectional view taken along the line shown in FIG. 2. The illustration of a housing 90 is omitted in FIG. 1.

The motor 1 of this embodiment is a brushless motor. As shown in FIG. 3, the motor 1 includes a housing 90, a rotor 10, a stator 20, a bus bar unit 65, a bearing holder 95, and a pair of bearings 98A, 98B. Herein, each element will be described in detail.

[Housing]

As shown in FIG. 3, the housing 90 has a cylinder portion 94 which extends along the center axis J, and a bottom portion 91 at an end portion on the front side (−Z side) of the cylinder portion 94. The housing 90 is made of, for example, metal. The stator 20, the bus bar unit 65, the bearing holder 95 and the pair of bearings 98A, 98B are received inside the housing 90.

The outer circumferential surface of the stator 20 and the outer circumferential surface of the bearing holder 95 are fitted into the inner circumferential surface of the cylinder portion 94. A shaft through hole 92, through which a shaft 11 of the rotor 10 passes, is provided at the center of the bottom portion 91. The bottom portion 91 has a bearing holding portion 93 which is disposed around the shaft through hole 92. The outer ring of the bearing 98A is fitted into the bearing holding portion 93. The shaft 11 is inserted through the inner ring of the bearing 98A. The shaft 11 passes through the shaft through hole 92, and extends in the axial direction. A portion of the shaft 11 protrudes from the bottom portion 91 toward the front side (−Z side).

[Rotor]

As shown in FIG. 3, the rotor 10 includes the shaft 11, a rotor core 12, and a rotor magnet 13. The shaft 11 has its center on the center axis J which extends in one direction (Z-axis direction). The shaft 11 is supported by the pair of bearings 98A, 98B so as to be rotatable about the axis.

The rotor core 12 surrounds the shaft 11 about the axis, and is fixed to the shaft 11. The rotor magnet 13 is fixed on an outer surface of the rotor core 12 along the axial circumference. The rotor core 12 and the rotor magnet 13 are integrally formed with the shaft 11 and rotate with the shaft.

[Stator]

As shown in FIG. 3, the stator 20 surrounds the rotor 10 about the axis, and rotates the rotor 10 about the center axis J. The stator 20 includes a core back portion 25, a plurality of teeth portions 22, a plurality of coils 21, and a plurality of insulators 24.

The core back portion 25 has a cylindrical shape which is concentric with the shaft 11. The teeth portions 22 extend from the inner surface of the core back portion 25 toward the shaft 11. The teeth portions 22 are provided in plurality, and arranged on the inner surface of the core back portion 25 at equal intervals in the circumferential direction. The insulators 24 are respectively installed to each of the teeth portions 22.

The coils 21 are formed by winding conductive wires. The coils 21 are attached to the teeth portion 22 through the insulators 24. A coil end 21a of each of the coils 21 extends from an upper end of the stator 20 toward the rear side (+Z side), passes through a coil end through hole 95a which is provided to the bearing holder 95, and connects with a neutral point bus bar 40 and a phase bus bar 50.

In this embodiment, the stator 20 has twelve teeth portions 22, and therefore twelve coils 21 are provided to be wound around each of the teeth portions 22. Every two of the twelve coils 21 are grouped into a coil group 26. Herein, the coil group refers to a group of one or two or more coils 21 formed from a single conductive wire 28. When the single conductive wire 28 wound around only one coil 21, the coil group consists of only one coil.

Figure 4:
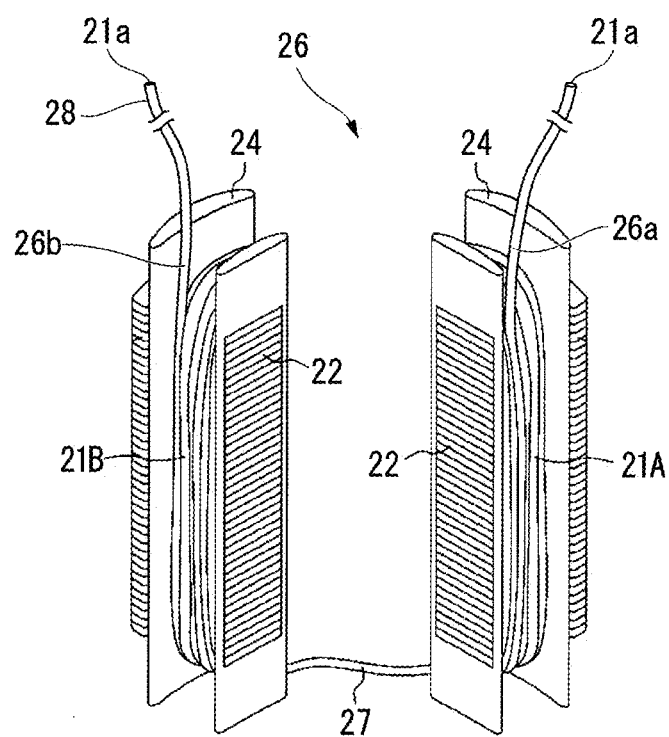
FIG. 4 is a perspective view of a coil group.

FIG. 4 is a perspective view of the coil group 26. Coils 21A, 21B, which belong to one coil group 26, is continuously formed with the single conductive wire 28. A cross-over wire 27, which is a portion of the conductive wire 28, is bridged between the coils 21A, 21B of one coil group 26.

In the coil group 26, the winding begins on one coil 21A side, from a radially inner side of the teeth portion 22 which extends in the radial direction of the stator 20. Further, in the coil group 26, the winding is finished over at the other coil 21B side, on a radially outer side of the teeth portion 22. That is, in the coil group 26, a winding beginning end 26a is disposed on a radially inner side of the stator 20, and a winding finishing end 26b is disposed on a radially outer side of the stator 20. As shown in this embodiment, in the coil group 26, either one of the winding beginning end 26a or the winding finishing end 26b is preferably disposed on a radially outer side of the stator 20, and the other is preferably disposed on a radially outer side of the coil 21 in the stator 20.

An end portion of the conductive wire 28 is routed between the stator 20 and the bearing holder 95, and guided to the coil end through hole 95a of the bearing holder 95. Further, the conductive wire 28 passes through the coil end through hole 95a, and connects with coil end connection portions 42, 52 of the neutral bus bar 40 or the phase bus bar 50. Since the winding beginning end 26a and the winding finishing end 26b of the coil group is respectively disposed on a radially inner side and on a radially outer side, the conductive wire 28 is inhibited from being biased to either the radially inner or outer side of the stator 20, in a space between the stator 20 and the bearing holder 95. As a result, it is possible to reduce the risk of short-circuiting, and at the same time, it is possible to inhibit the axial size of the motor from increasing due to overlapping coil ends 21a.

[Bearing Holder]

As shown in FIG. 3, the bearing holder 95 is arranged to cover the rear side (+Z side) of the stator 20. The bearing holder 95 includes a holder disc portion 99, which has a disc shape when viewed in the axial direction, a bearing holding portion 96 which has a cylinder shape, and a holder peripheral wall portion 96a which has a cylinder shape.

A shaft through hole 97 is provided at the center of the holder disc portion 99. The shaft 11 passes through the shaft through hole 97. Further, a plurality of coil end through holes 95a, through which the coil ends 21a extended from the coils 21 of the stator 20 pass, are penetratingly provided on the holder disc portion 99. The coil end through holes 95a are aligned on a circle which surrounds the shaft through hole 97. A single coil end 21a passes through a single coil end through hole 95a. The bearing holding portion 96 is provided around the shaft through hole 97 of the holder disc portion 99. The outer ring of the bearing 98B is fitted into the bearing holding portion 96. The shaft 11 of the rotor 11 is fitted into the inner ring of the bearing 98B. The holder peripheral wall portion 96a has a wall shape, and extends from an outer edge of the holder disc portion 99 toward the front side (−Z side). The outer circumferential surface of the holder peripheral wall portion 96a is fitted with the inner circumferential surface of the housing 90.

[Bearing]

As shown in FIG. 3, the pair of bearings 98A, 98B are disposed on each axial side of the rotor core 12 in the stator 20. The bearing 98A disposed on the rear side (+Z side) is retained by the bearing holding portion 96 of the bearing holder 95. The bearing 98B disposed on the front side (−Z side) is retained by the bearing holding portion 93 of the housing 90. The pair of bearings 98A, 98B support the shaft 11 of the rotor 10. The structure of the pair of bearings 98A, 98B is not limited to a particular structure, and any known type of bearing may be used.

[Bus Bar Unit]

The bus bar unit 65 is fixed on a rear side (+Z side) surface of the baring holder 95. As shown in FIG. 1 and FIG. 2, the bus bar unit 65 includes two neutral point bus bars (bus bar) 40, six phase bus bars (bus bar) 50, and a bus bar holder 60. That is, the motor 1 having the bus bar unit 65 is also provided with the neutral point bus bars (bus bar) 40 and the phase bus bars (bus bar) 50.

The neutral point bus bar 40 includes a coil end connection portion 42, and the phase bus bar 50 includes a coil end connection portion 52. The coil end connection portions 42, 52 are respectively electrically connected with the coil end 21a which is extended from the coil 21. Further, the phase bus bar 50 has a terminal connection portion 54. A terminal 5 is electrically connected with the terminal connection portion 54. Two terminals 5 are provided at every approximate 120° along the circumferential direction.

The bus bars of the neural point bus bar 40 and the phase bus bar 50 are formed by bending a plate shape member in a strip form having a constant width along a bending line in the width direction, such that the height (length in the axial direction) of the bus bars are constant. With this, it is possible to wire the neutral point bus bar 40 and the phase bus bar 50 within a plane perpendicular to the center axis J.

In the bus bar unit 65, the plurality of neutral point bus bars 40 and the plurality of phase bus bars 50 do not overlap with one another in the axial direction. That is, when the bus bar unit 65 is viewed in the axial direction, every neutral point bus bar 40 and every phase bus bar 50 are disposed on respectively different locations. With this, it is possible to reduce the size of the bus bar unit 65 in the axial direction, and it is therefore possible to configure the motor 1 to have a compact size in the axial direction.

Further, as shown in FIG. 2, the terminal connection portions 54 of the phase bus bars 50 are aligned along the circumferential direction. The neutral point bus bar 40 is disposed between the terminal connection portions 54 of the phase bus bars 50 in the circumferential direction. The neutral point bus bar 40 is disposed on a radially inner side than at least a portion of the main body portions 51A, 51B, 51C, 51D, which will be described in more detail in a subsequent section. Accordingly, the size of the motor 1 is inhibited from being increased in the radial direction, and the neutral point bus bars 40 and the phase bus bars 50 can be disposed while effectively using a limited area.

[Neutral Point Bus Bar]

The neutral point bus bar 40 is provided to connect a U-phase, a W-phase and a W-phase of the stator 20 to a neutral point. The motor 1 of this embodiment has two three-phase circuits. Each of the two neutral point bus bars 40 is connected to the coil ends 21a of the U-phase, the V-phase and the W-phase extended from the stator 20, and thereby connects the U-phase, the V-phase and the W phase to a neutral point.

Figure 5:
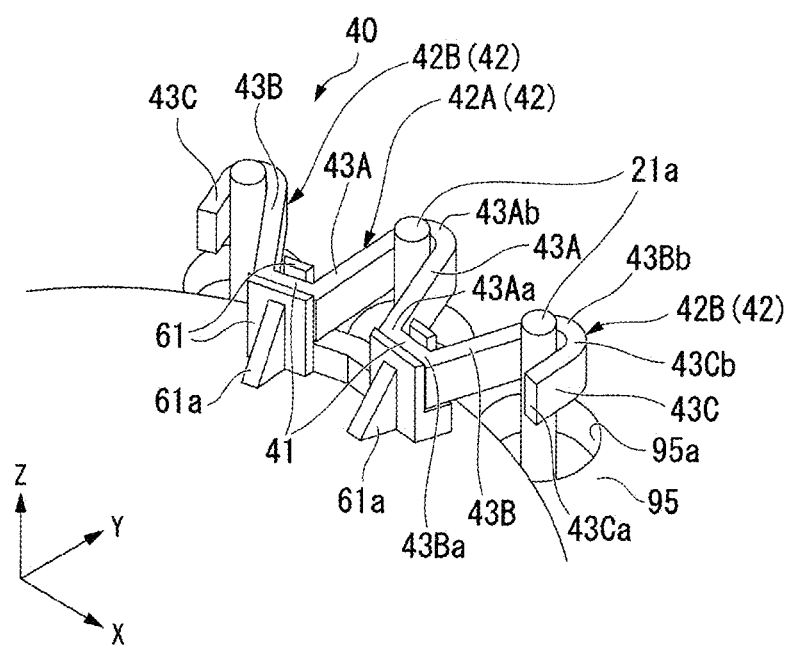
FIG. 5 is an enlarged perspective view of a neutral point bus bar which is provided to the motor shown in FIG. 1.

FIG. 5 is an enlarged perspective view of the neutral point bus bar 40 which is provided to the motor 1. The width direction of the neutral point bus bar 40 is identical to the axial direction of the center axis J, and the length direction of the neutral point bus bar 40 extends within a plane perpendicular to the center axis J.

The neutral point bus bar 40 includes two main body portions 41, and three coil end connection portions 42. The two main body portions 41 and the tree coil end connection portions 42 are alternately arranged along the length direction.

The main body portion 41 of the neutral point bus bar 40 is disposed between coil end connection portions 42. The main body portion 41 is sandwiched between a pair of bus bar fixing pieces 61 of the bus bar holder 60 in the thickness direction. When a distance exists between the neighboring coil end connection portions 42, the main body portion 41 may be extended in the length direction into a circular arc shape. Further, it is unnecessary to have every surface of the main body portion 41 sandwiched between the pair of bus bar fixing pieces 61, as long as the neutral point bus bar 40 is not short-circuited, and moreover, as long as the support for the neutral point bus bar 40 does not become unstable.

The coil end connection portion 42 extends radially outward from the main body portion 41. Herein, among the three coil end connection portions 42, the coil end connection portion disposed between the two main body portions 41 is referred to as a first coil end connection portion 42A, and the coil end connection portions disposed on either end of the neutral point bus bar are referred to as second coil connection portions 42B.

The first coil end connection portion 42A has a pair of gripping pieces 43A. Either end of the gripping piece 43A in the length direction is referred to as one end portion 43Aa and the other end portion 43Ab. The one end portion 43Aa is connected with the main body portion 41. The other end portions 43Ab of the pair of gripping pieces 43A are connected to each other. Further, herein, the description of being 'connected' not only refers to a case of two members forming a connection, but it may also include a case of two portions being continuously extended as one member. In this embodiment, the pair of gripping pieces 43A, which are connected by the other end portion 43Ab, are continuously formed of a single member from the other end portion 43Ab. Likewise, the main body portion 41 and the gripping piece 43A, which are connected to each other, are continuously formed of a single member.

The pair of gripping pieces 43A face each other, and are in contact with a circumferential surface of the coil end 21a. The pair of gripping pieces 43A grip the coil end 21a. The pair of gripping pieces 43A and the coil end 21a are electrically connected by means of a known technique, such as welding, and the like.

The second coil end connection portion 42B has a pair of inner gripping pieces (gripping piece) 43B and a pair of outer gripping pieces (gripping piece) 43C. The inner gripping piece 43B is disposed on the main body portion 41 side. The outer gripping piece 43C is disposed on an opposite side from the main body portion 41. Either end portion of the inner gripping piece in the length direction is referred to as one end portion 43Ba and the other end portion 43Bb. Likewise, either end portion of the outer gripping piece 43C in the length direction is referred to as one end portion 43Ca and the other end portion. The one end portion 43Ba of the inner gripping piece 43B is connected with the main body portion 41. The other end portion 43Bb of the inner gripping piece 43B is connected with the other end portion 43Cb of the outer gripping piece 43C. The one end portion 43Ca of the outer gripping piece 43C is a terminal end portion of the neutral point bus bar 40 in the length direction. The inner gripping piece 43B and the outer gripping piece 43C are electrically connected to the coil end 21a, while the coil end 21a is sandwiched therebetween.

The coil end connection portion 42 (the first coil end connection portion 42A and the second coil end connection portion 42B) extends radially outward from the main body portion 41, and the gripping pieces are connected to each other on an opposite side from the main body portion 41. The coil end connection portion 42 has a U-shape which is open toward a radially inner side. The coil end connection portion 42 grips the coil end 21a at the opening. In this embodiment, the coil end connection portion 42 is open toward a radially inner side; however, the coil end connection portion may be open toward any direction as long as it is open toward one direction within a plane perpendicular to the axial direction of the center axis J. In this embodiment, the pairs of gripping pieces (the pair of gripping pieces 43A, or the pairs of gripping pieces 43B, 43C) are disposed diagonally from each other so as to expand on the opening side. However, the pairs of gripping pieces may be arranged in parallel.

[Phase Bus Bar]

The phase bus bar 50 is electrically connected with the coil end 21a of the stator 20. Further, the phase bus bar 50 has a terminal 5 for a connection with an external device 100. The external device 100 connected with the terminal 5 is, for example, an ECU (Electronic Control Unit). The stator 20 receives drive current from the external device 100 through the terminal 5 and the phase bus bar 50. The phase bus bar 50 is connected respectively with the coil end 21a of the U-phase coil, the coil end 21a of the V-phase coil, and the coil end 21a of the W-phase coil, which are extended from the stator 20.

The six phase bus bars 50 may respectively have different shapes. The width direction of the phase bus bar 50 is identical to the axial direction of the center axis J, and the length direction of the phase bus bar 50 extends within a plane perpendicular to the center axis J.

Figure 6:
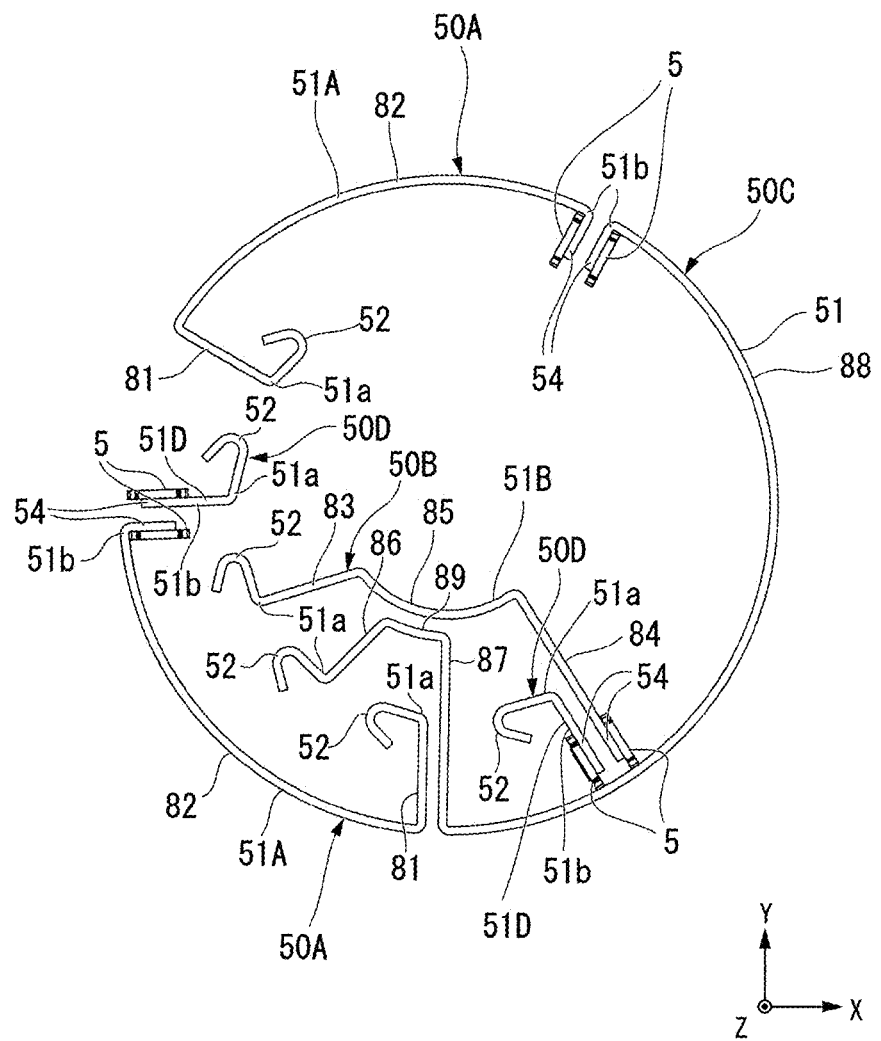
FIG. 6 is a top view of a phase bus bar which is provided to the motor shown in FIG. 1.

FIG. 6 is a top view of the phase bus bar. The phase bus bar 50 is classified into a first type phase bus bar 50A, a second type phase bus bar 50B, a third type phase bus bar 50C, and a fourth type phase bus bar 50D, which respectively have different structures. The main function of the four types of phase bus bars 50A, 50B, 50C, 50D is the same. The classification of the phase bus bars 50A, 50B, 50C, 50D is provided for the convenience of explaining similar structures. Further, the phase bus bars 50 classified into the same type may not have identical shapes.

The first, second, third and fourth type phase bus bars 50A, 50B, 50C, 50D have the coil end connection portion 52, and the terminal connection portion 54. Further, the first, second, third and fourth type phase bus bars 50A, 50B, 50C, 50D respectively have the main body portions 51A, 51B, 51C, 51D (main body portion 51). In the first, second, third and fourth type phase bus bars 50A, 50B, 50C, 50D, the main body portions 51A, 51B, 51C, 51D have different structure, and the coil end connection portion 52 and the terminal connection portion 54 have the same structure. The main body portions 51A, 51B, 51C, 51D have a first end 51a and a second end 51b on either end thereof in the length direction. The first end 51a is connected with the coil end connection portion 52. The terminal connection portion 54 is provided on the second end 51b. The external device 100 (see FIG. 3) and the terminal 5 are electrically connected with the terminal connection portion 54.

Two first type phase bus bars 50A are provided to the motor 1 of this embodiment. The main body portion 51A of the first type phase bus bar 50A has a linear portion 81 and an arcuate portion 82. The linear portion linearly extends radially outward from the first end 51a of the main body portion 51A. The arcuate portion 82 is connected to the linear portion 81, and extends in a circular arc shape to the second end 51b of the main body portion 51A along the circumferential direction.

One second type phase bus bar 50B is provided to the motor 1 of this embodiment. The main body portion 51B of the second type phase bus bar 50B has a first linear portion 83, a second linear portion 84, and an arcuate portion 85. The first linear portion 83 linearly extends radially inward from the first end 51a of the main body portion 51B. The second linear portion 84 linearly extends radially inward from the second end 51b of the main body portion 51B. The arcuate portion 85 extends in a circular arc shape along the circumferential direction of the motor 1. Either end portion of the arcuate portion 85 is respectively connected with the first linear portion 81 and the second linear portion 84.

One third type phase bus bar 50C is provided to the motor 1 of this embodiment. The main body portion 51C of the second type phase bus bar 50C has a first linear portion 86, a second linear portion 87, a first arcuate portion 88, and a second arcuate portion 89. The first arcuate portion 88 and the second arcuate portion 89 extend in a circular arc shape along the circumferential direction of the motor 1. The first arcuate portion 88 and the second arcuate portion 89 are concentric, and the first arcuate 88 has a bigger diameter than the second arcuate portion 89, and is disposed on an outside-biased side. The first arcuate portion 88 extends from the second end 51b, and is connected with the second linear portion 87. The second linear portion 87 linearly extends radially inward from an end portion of the first arcuate portion 88, and is connected with the second arcuate portion 89. The first linear portion 86 linearly extends radially inward from the first end 51a, and is connected with the second arcuate portion 89.

Two fourth type phase bus bar 50D are provided to the motor 1 of this embodiment. The first end 51a and the second end 51b of the main body portion 51D in the fourth type phase bus bar 50D are aligned in the radial direction of the motor 1. The main body portion 51D linearly extends in the radial direction.

As shown in FIG. 1, the main body portion 51 (main body portions 51A, 51B, 51C, 51D) of the first, second, third, and fourth phase bus bars 50A, 50B, 50C, 50D is supported by being sandwiched between bus bar fixing pieces 62 of the bus bar holder 60.

The terminal connection portions 54 of the first, second, third, and fourth type phase bus bars 50A, 50B, 50C, 50D have the same structures. The terminal connection portion 54 is connected to the second end 51*b* of the main body portion 51 (main body portions 51A, 51B, 51C, 51D). The terminal connection portion 54 extends in the radial direction of the motor 1. The terminal 5 is fixed to at least one surface of the terminal connection portion 54 by means of welding, and the like.

The terminal 5 is welded to the terminal connection portion 54 of the main body portion 51 such that the terminal protrudes from the main body portion toward the rear side (+Z side) of the motor 1. When viewed in the axial direction, the terminal 5 is provided on the same location as a socket of the external device 100. By fixing the axially extending terminal 5 to the terminal connection portion 54, it is possible to form the phase bus bar 50 by bending a rectangular plate-like member having a constant width in the thickness direction. As a result, by fixing the terminal 5 in a subsequent step, the phase bus bar 50 may be easily manufactured, and the manufacturing costs may be reduced thereby.

Figure 7:
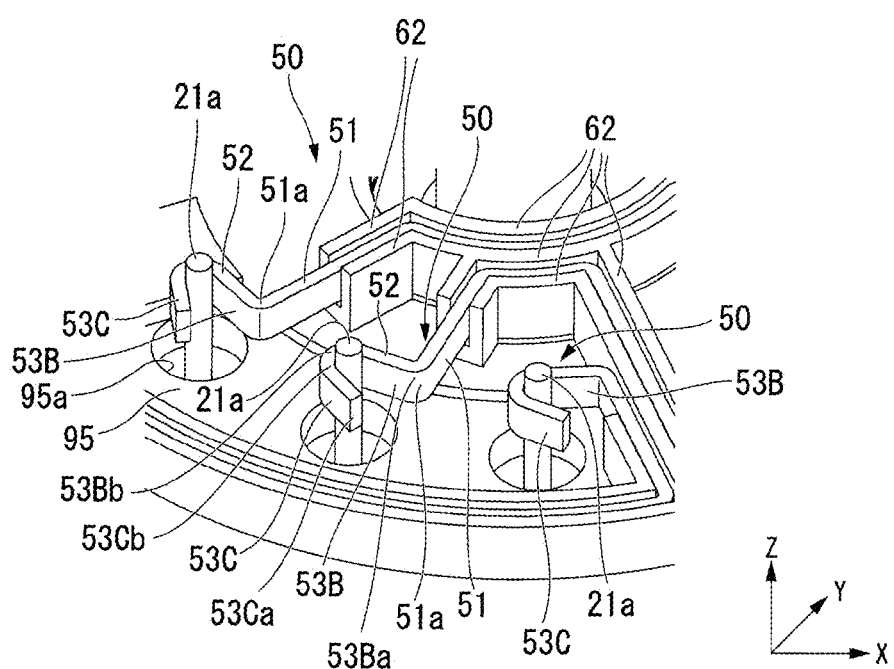
FIG. 7 is an enlarged perspective view of a coil end connection portion of the phase bus bar which is provided to the motor shown in FIG. 1.

FIG. 7 is an enlarged perspective view of the coil end connection portion 52 of the phase bus bar 50 which is provided to the motor 1. The coil end connection portions 52 of the first, second, third, and fourth type phase bus bars 50A, 50B, 50C, 50D have the same structures.

As shown in FIG. 7, the coil end connection portion 52 of the phase bus bar 50 has inner gripping pieces (gripping piece) 53B and outer gripping pieces (gripping piece) 53C. The inner gripping piece is disposed on the main body portion 51 side. The outer gripping piece 53C is disposed on an opposite side from the main body portion 51. The inner gripping pieces 53B have one end portion 53Ba and the other end portion 53Bb on both ends portions in the length direction. Likewise, the outer gripping pieces 53C have one end portion 53Ca and the other end portion 53Cb on both end portions in the length direction. One end portion 53Ba of the gripping pieces 53B disposed on the main body portion 51 side is connected with the first end 51*a* of the main body portion 51. The other end portion 53Bb of the gripping pieces 53B is connected with the other end portion 53Cb of the gripping pieces 53C. One end portion 53Ca of the gripping pieces 53C is a longitudinal end portion of the phase bus bar 50. The inner gripping pieces 53B and the outer gripping pieces 53C face each other and respectively contact a circumferential surface of the coil end 21*a*. The inner gripping pieces 53B and the outer gripping pieces 53C are electrically connected to the coil end 21*a*, the coil end 21*a* being sandwiched therebetween.

The coil end connection portion 52 extends from the main body portion 51 in one direction, and the gripping pieces are connected to each other on an opposite side from the main body portion 51. The coil end connection portion 52 has a U-shape which is open toward one direction within a plane perpendicular to the axial direction of the center axis J. The coil end connection portion 52 grips the coil end 21*a* at the opening.

[Bus Bar Holder]

As shown in FIG. 3, the bus bar holder 60 is disposed on the rear side (+Z side) of the bearing holder 95. The bus bar holder 60 supports the neutral point bus bar 40 and the phase bus bar 50 from the front side (−Z side).

As shown in FIG. 1 and FIG. 2, the bus bar holder 60 has a disc portion 66, an annular portion 67 which surrounds the disc portion 66 from the outside while maintaining a spatial gap between the disc portion 66, and four bridge portions 68 which extend in the radial direction and connect the disc portion 66 and the annular portion 67. A shaft through hole 66*a* is provided to the disc portion 66 for the shaft 11 to pass therethrough. That is, the bus bar holder 60 is a disc-shaped member having a shaft through hole 66*a* at the center thereof for the shaft 11 to pass therethrough.

Further, the bus bar holder 60 has neutral point bus bar fixing pieces 61 to support the neutral point bus bar 40, and a phase bus bar fixing bar 62 to support the phase bus bar 50. The neutral point bus bar fixing pieces 61 are provided on the disc portion 66. The phase bus bar fixing piece 62 is provided over the disc portion 66, the bridge portions 68 and the annular portion 67.

An axially void area surrounded by the disc portion 66, the annular portion 67 and the bridge portions 68 of the bus bar holder 60 defines an opening 69. The coil end connection portions 42, 52 of the neutral point bus bar 40 and the phase bus bar 50 are disposed on an inner side of the opening 69 when viewed in the axial direction. The coil end 21*a* is inserted to the opening 69, from the stator 20 through the coil end through hole 95*a* of the bearing holder 95, and connected to the coil end connection portions 42, 52.

Four neutral point bus bar fixing pieces (bus bar fixing piece) 61 are provided on the rear side (+Z side) surface of the disc portion 66. The neutral point bus bar fixing pieces 61 protrude in the axial direction. As shown in FIG. 5, the pair of neutral point bus bar fixing pieces 61 supports the main body portion 41 of the neutral point bus bar 40 by sandwiching it in the thickness direction. The neutral pint bus bar pieces 61 respectively support the two main body portions 41 of a single neutral point bus bar 40. Here, each of the coil end connection portions 42 faces the opening 69, and is disposed on an axially upper side of each coil end 21*a*.

As shown in FIG. 5, one of the pair of neutral point bus bar fixing pieces 61 has rib 61*a* which extends in the axial direction. With this rib 61*a*, the rigidity of the neutral point bus bar fixing piece 61 can be improved.

In this embodiment, among the pair of neutral point bus bar fixing pieces 61, the rib 61*a* is provided on the neutral point bus bar fixing piece 61 disposed on an opposite side from the direction in which the coil end connection portion 42 of the neutral bus bar 40 is extended. Herein, the description is further focused on the process of welding the first coil end connection portion 42A, which is disposed at the center of the three coil end connection portion 42 of the neutral bus bar 40, with the coil end 21*a*. The first coil end connection portion 42A is welded while gripping the coil end 21*a*, and is thereby electrically connected with the coil end 21*a*. The pair of gripping pieces 43A, 43A of the first coil end connection portion 42A may be brought closer to each other so as to securely sandwich the coil end 21*a* therebetween. Further, the second coil end connection portion 42B, which is connected with the first coil end connection portion 42A across the main body portion, is pulled closer to the first coil end connection portion 42A side. Accordingly, a stress having a radially inward direction, which is applied from the second coil end connection portion 42B toward the opening of the coil end connection portion 42, is applied to the neutral point bus bar fixing piece 61. Since the rib 61*a* is provided on the neutral point bus bar fixing piece 61 that is disposed on the opening side of the coil end connection portion 42, the effect of suppressing a damage of the neutral point bus bar fixing piece 61, which may be caused by a stress applied toward the opening, can be enhanced.

The phase bus bar fixing piece 62 is provided to the disc portion 66, the annular portion 67 and the bridge portions 68 of the bus bar holder 60. The phase bus bar fixing piece 62 protrudes in the axial direction. The phase bus bar fixing piece 62 supports the main body portion 51 of the phase bus bar 50 and the terminal connection portion 54 by sandwiching them from both sides in thickness direction. In this embodiment, the phase bus bar fixing piece 62 surrounds the entire circumference of the main body portion 51 of the phase bus bar 50 and the terminal connection portion 54. Accordingly, it is possible to prevent short-circuiting of the phase bus bars 50. Here, each of the coil end connection portions 52 faces the opening 69, and is disposed on an axially upper side of each of the coil end 21a. The arcuate portions 82, 88 of the main body portion 51 are supported by the phase bus bar fixing piece 62 provided to the annular portion 67. The arcuate portions 85, 89 of the main body portion 51 are supported by the phase bus bar fixing piece 62 provided near the shaft through hole 66a of the disc portion 66. That is, at least a portion of the main body portion of the phase bus bar has an arcuate portion, and this arcuate portion is disposed on an outer circumference or on an inner circumferential edge of the bus bar holder.

In this embodiment, the neutral point bus bar 40 and the phase bus bar 50 are supported by being sandwiched between the bus bar fixing pieces 61, 62 of the bus bar holder 60. However, the neutral point bus bar 40 and the phase bus bar 50 may be embedded in the bus bar holder 60 by insert molding. When insert molding is performed, the bus bar holder 60 exposes the coil end connection portion 52 of the neutral point bus bar 40, the coil end connection portion 52 and the coil end connection portion 54 of the phase bus bar 50.

[Manufacturing Method]

Herein, a method manufacturing the motor 1 will be described. The drawings, which are referred to in the following descriptions to explain the manufacturing method, are mimetic drawings, and they may not necessarily illustrate strictly accurate shapes of the mold, the neutral point bus bar 40, the phase bus bar 50, and the like. The method of manufacturing the motor 1 includes steps of manufacturing the neutral point bus bar 40 and the phase bus bar 50. Further, the method of manufacturing the motor 1 includes a step of electrically connecting the neutral point bus bar 40 and the phase bus bar 50 with the coil end 21a.

[Method of Manufacturing a Neutral Point Bus Bar]

Herein, a method of manufacturing a neutral point bus bar 40 is described with reference to FIG. 8, FIG. 9 and FIG. 10. The method of manufacturing a neutral point bus bar 40 includes a first step for preparing a plate shape member 70 which extends in the form of a strip; and a second step for bending the plate shape member 70 in the thickness direction to form a neutral point bus bar 40.

Figure 8:
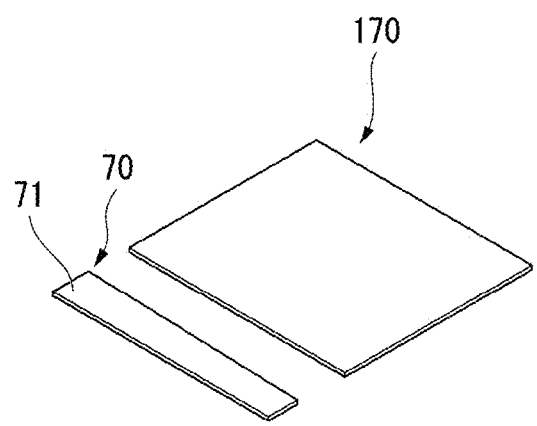
FIG. 8 illustrates a manufacturing process of the neutral point bus bar, in which a board is severed to form a plate shape member.
Figure 9:
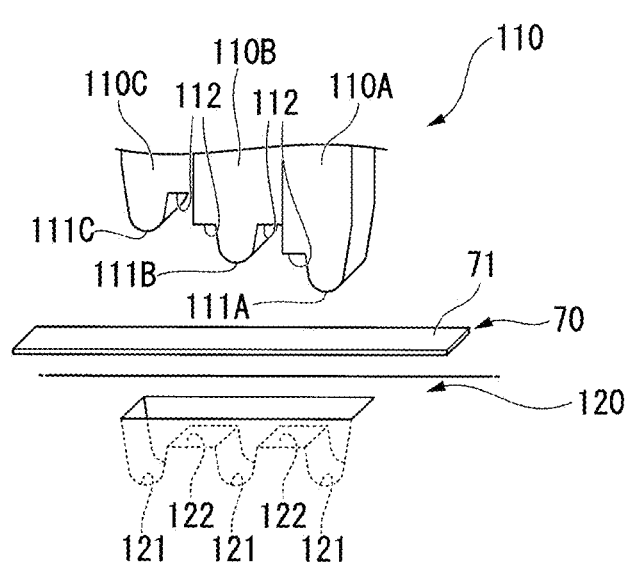
FIG. 9 illustrates a manufacturing process of the neutral point bus bar, in which the plate shape member is sandwiched between a pair of molds and press-processed.

As shown in FIG. 8, the first step is performed to cut a board 170 and form the plate shape member 70 which extends in the form of a strip. In the first step, the board 170 may be cut by using, for example, punch-processing press.

Herein, the second step will be described. In the second step, press-processing is performed to form a coil end connection portion by sandwiching the plate shape member 70 between a pair of molds 110, 120. As shown in FIG. 9, a first mold 110 and a second mold 120, which are formed as a pair, are prepared. The first mold 110 has a convex shape on the bottom surface, and the second mold 120 has a concave shape on the top surface. The first mold 110 and the second mold 120 have substantially inverted concave and convex shapes.

The first mold 110 consists of a first block 110A having a convex portion 111A, a second block 110B having a convex portion 111B, and a third block 110B having a convex portion 111B. The blocks 110A, 110B, 110C have identical width (measurement in a depth direction shown in FIG. 9). Also, the blocks 110A, 110B, 110C are disposed alongside one another. Each of the convex portions 111A, 111B, 111C protrudes in a downward direction. A flat portion 112 is provided between each of the convex portions 111A, 111B, 111C.

The second mold 120 has a groove shape with a constant width. The second mold 120 has three concave portions 121 provided on the groove shape bottom. The three concave portions 121 are aligned in the length direction. The flat portion 122 is provided between the concave portions 121.

As a next step, the plate shape member 70 is arranged between the first mold 110 and the second mold 120. The plate shape member 70 may be disposed inside the groove of the second mold. Then, the first mold 110 and the second mold 120 are superimposed to plastically deform the plate shape member 70 in the thickness direction, in accordance with the shape of the mold. Here, each of the blocks 110A, 110B, 110C is lowered with a time difference. For example, the first block 110A, the second block 110B, and the third block 110C are superimposed with the second mold 120 is said order. Then, the plate shape member 70 is plastically deformed by the convex portion 111A, the convex portion 111B, and the convex portion 111C, respectively between the second mold 120 in said order. A portion sandwiched between each of the convex portions 111A, 111B, 111C and the concave portion 121 of the second mold is bent in the thickness direction, and formed into a pair of gripping pieces 43 facing each other. Also, a portion sandwiched between the flat portion 112 of the first mold 110 and the flat portion 122 of the second mold 120 maintains a flat shape of the plate shape member before processing, and becomes the main body portion 41.

Figure 10:
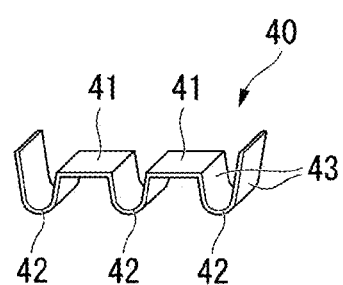
FIG. 10 illustrates the neutral point bus bar which is formed by the manufacturing process shown in FIG. 8 and FIG. 9.

After going through the above described steps, the neutral bus 40 as shown in FIG. 10 is manufactured. Especially, since each of the blocks 110A, 110B, 110C is lowered with a time difference, excessive load is not even partially applied to the plate like member 70. That is, the neutral point bus bar 40 can be formed without being severed in the length direction during the molding step. Further, the first step, in which the plate shape member 70 is cut out from the board 170, and the second step, in which the plate shape member 70 is bent to form the neutral point bus bar 40, may be performed as a continuous press-processing, by using an automatic conveying device.

Further, in the embodiment described above, an exemplary case was suggested, in which the first block 110A, the second block 110B, and the third block 110C of the first mold 110 are superimposed with the second mold 120 in said order. However, the order of the blocks 110A, 110B, 110C is not limited thereto. Further, in the embodiment described above, an exemplary case was suggested, in which the three blocks 110A, 110B, 110C are lowered with a time difference. However, the convex portions 111A, 111B, 111C may each be provided to three different molds, and press-processing may be performed respectively to each mold as separate steps.

[Method of Manufacturing a Phase Bus Bar]

Figure 12:
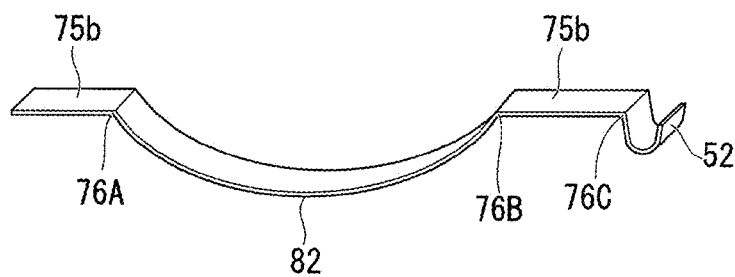
FIG. 12 illustrates an intermediate product of the phase bus bar formed by the manufacturing process shown in FIG. 11.
Figure 13:
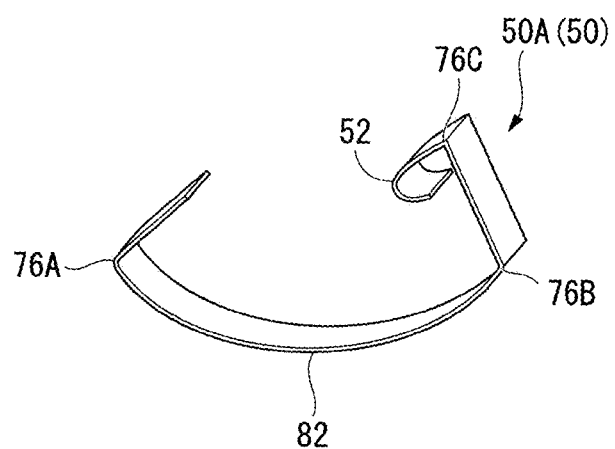
FIG. 13 illustrates the phase bus bar which is formed by additionally performing a bending process to the intermediate product of FIG. 12.

A method of manufacturing the phase bus bar 50 will be described with reference to FIG. 11, FIG. 12 and FIG. 13.

Herein, among the phase bus bar 50, the method of manufacturing the first type phase bus bar 50A (see FIG. 6) will be explained. The second, third and fourth type phase bus bars 50B, 50C, 50D can be manufactured by appropriately selecting the same manufacturing method as necessary.

First, in the same manner as the manufacturing method of the neutral point bus bar 40, a plate shape member 75 extending in the form of a strip is formed by cutting a board 170 having conductive properties. Further, as in the manufacturing of the neutral point 40, the plate shape member 75 is sandwiched between a press mold to form the coil end connection portion 52 which is open toward on direction near one end portion 75a of the plate shape member 75. Except for the end portion 75a, the plate shape member 75 is formed of a flat portion 75b having a linear shape.

Figure 11:
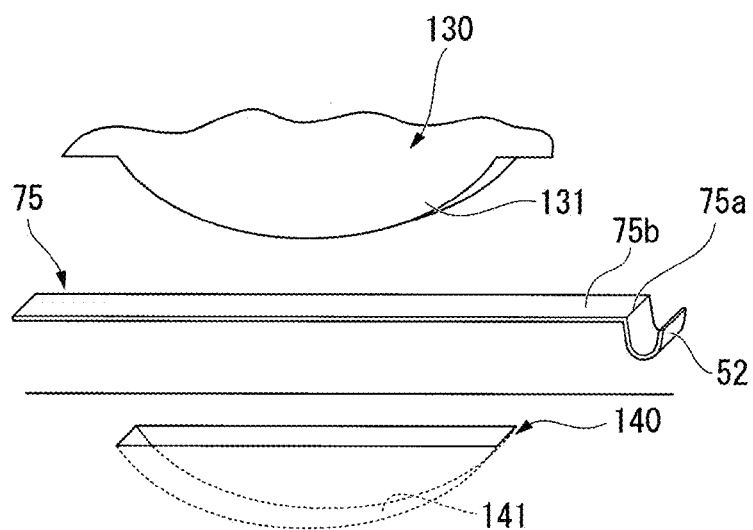
FIG. 11 illustrates a manufacturing process of the phase bus bar, in which the plate shape member is sandwiched between a pair of molds and press-processed.

Then, as shown in FIG. 11, a first mold 130 and a second mold 140, which have substantially inverted concave and convex shapes, are provided. The first mold 130 has a convex portion on the bottom surface, and the second mold 140 has a concave portion on the top surface.

The first mold 130 has an arched convex portion 131 which is curved in a gradually arcuate shape and protrudes in a downward direction. The first mold 130 has a constant width, and extends in the same cross section in the width direction (depth direction shown in FIG. 11). The second mold 120 has a groove shape having a constant width formed in the depth direction. The second mold 120 has an arched concave portion 141 which is recessed in a gradually arcuate shape.

Then, the flat portion 75b of the plate shape member 75 is disposed between the first mold 130 and the second mold 140. The first mold 130 is superimposed with the second mold 140, and the plate shape member 70 is thereby plastically deformed in accordance with the shape of the mold. As a result, an intermediate product 150 of the phase bus bar 50A is formed as shown in FIG. 12. The intermediate product 150 has a center portion curved into an arcuate shape, and the flat portion 75b remains on either side of the curved portion. The curved portion becomes the arcuate portion 82 which is a part of the main body portion 51.

Then, boundaries 76A, 76B between the arcuate portion 82 and the flat portion 75b disposed on either side of the arcuate portion 82, and a boundary 76C between the flat portion 75b and the coil end connection portion 52 are bent. The boundaries 76A, 76B, 76C may be bent by press-processing, or by any other known technique. Through the steps described above, the first type phase bus bar 50A as shown in FIG. 13 is manufactured.

[Process of Connecting Coil End and Bus Bar]

Herein, a process of electrically connecting the coil end connection portion 42 of the neutral point bus bar with the coil end 21a is described with reference to FIG. 14. The coil end connection portion 52 of the phase bus bar 50 can be connected with the coil end 21a through the same process described below. Further, herein, explanation will only refer to the coil end connection portion 42, without separately referring to the first and the second coil end connection portions 42A, 42B (see FIG. 5). Likewise, the following explanation will only refer to the gripping pieces 43, without separately referring to the individual gripping piece 43 of the coil end connection portion 42.

When performing the connection process, first, the coil end 21a is disposed between the pair of gripping pieces 43 of the coil end connection portion 42. The coil end connection portion 42 is open toward one direction within a plane perpendicular to the center axis J. The coil end 21a is tilted toward the opening direction in advance, and after assembling the neutral point bus bar 40, the coil end 21a is linearly extended along the axial direction. Accordingly, the coil end 21a can be conveniently disposed between the pair of gripping pieces 43 of the coil end connection portion 42.

Figure 14:
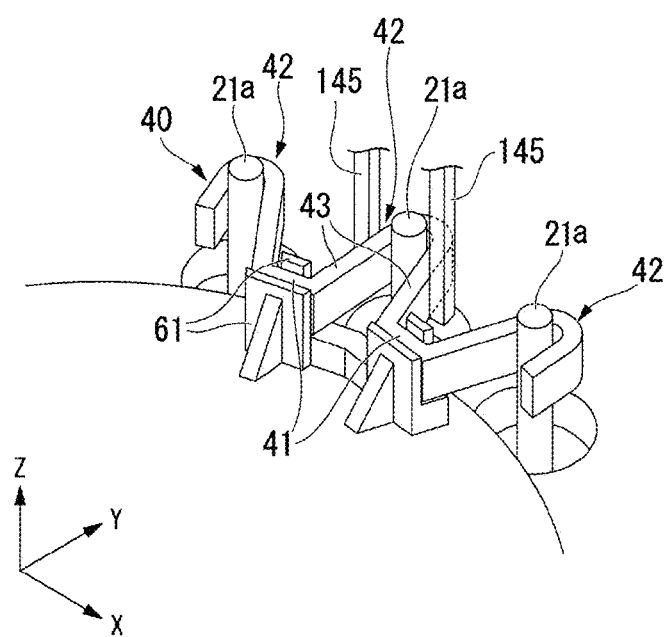
FIG. 14 illustrates a process of electrically connecting the bus bar and the coil end.

Then, as shown in FIG. 14, a pair of electrode rods 145 are disposed on an outer side of the pair of gripping pieces 43 of the coil end connection portion 43. Further, the pair of electrode rods 145 pressurize the pair of gripping pieces 43 such that it is pressed from a radially outer side of the coil end 21a.

Subsequently, voltage is applied to the pair of electrode rods 145. The electric current flows from one electrode rod 145, bypasses the pair of gripping pieces 43, and flows to the other electrode rod 145. With the flow of electric current, the electrode rods 145 and the pair of gripping pieces 43 are heated, and this heat is applied to the coil end 21a. As a result, the covering, which surrounds the coil end 21a, is melted by the applied heat. Further, when voltage is continuously applied, electric current flows between the gripping piece 43 and the coil end 21a, such that the gripping piece 43 and the coil end 21a are welded together. Through the steps described above, the process of connecting the coil end connection portion 42 with the coil end 21a is complete.

Further, herein, connection may be formed by performing resistance welding with the pair of electrode rods 145 is explained. As another method of electrically connecting the coil end connection portion 42 with the coil end 21a, other known welding methods such as Tig welding may be employed.

EFFECTS OF THE EMBODIMENT

The neutral point bus bar 40 and the phase bus bar 50 of the motor 1 according to this embodiment are formed of a conductive plate shape member 70 which is bent in a thickness direction. The neutral point bus bar 40 and the phase bus bar 50 are formed by cutting out a plate shape member 70 having a quadrangle shape from a single sheet of conductive board 170 in a necessary length, and then bending it in a thickness direction. An inexpensive motor 1 can be provided by this embodiment since the manufacturing process is simple as described above. Further, since the plate shape member 70 has a quadrangle shape in this embodiment, it is possible to increase the number of neutral point bus bar 40 and the phase bus bar 50 that can be formed from a single sheet of board 170. As a result, the material costs can be reduced, and thereby an inexpensive motor 1 can be provided. Further, in the process of manufacturing the phase bus bar 50, the plate shape member 170 may be formed by cutting out two orthogonal quadrangle portions in an L-shape from the board 170, and bending one quadrangle portion in a thickness direction. In this case, the other quadrangle portion may be used the terminal 5 that extends in the axial direction.

Further, the neutral point bus bar 40 and the phase bus bar 50 (herein, simply referred to as bus bars 40, 50) of the motor 1 according to this embodiment have the coil end connection portions 42, 52 which are open toward one direction within a plane perpendicular to the axial direction. Since the coil end connection portions 42, 52 are open toward one direction, the coil end 21a can be inserted from the opening side, and thereby an easy assembling process may be provided.

The coil end connection portions 42, 52 of the bus bars 40, 50 according to this embodiment also have a pair of gripping pieces for gripping the coil end 21a. With this, the coil 21a can be securely connected with the coil end connection portions 42, 52 when weld is performed, and therefore the security of the welding can be increased.

The coil end connection portions 42, 52 of the bus bars 40, 50 according to this embodiment also have an opening, and the pair of gripping pieces are configured not to contact each other at one end portion. Therefore, when connection process by resistance welding is performed, the gripping pieces can securely press the coil end 21a in the circumferential direction and pressure can be easily applied thereto. Also, since the narrow opening absorbs the deformation caused at the time of applying pressure, load is hardly applied to the adjacent coil connection portions 42, 52, or to the bus bar fixing pieces 61, 62 of the bus bar holder 60. Accordingly, it is possible to inhibit the damage which may be done to the bus bar holder 60 as well as to the bus bars 40, 50 during the connection process.

The motor 1 according to this embodiment also has the pair of neutral point bus bar fixing pieces 61 and the pair of phase bus bar fixing pieces 62 (herein, simply referred to as bus bar fixing pieces 61, 62). The main body portions 41, 51 of the bus bars 40, 50 are supported by being sandwiched between the bus bar fixing pieces 61, 62 in a thickness direction. As a result, it is possible for the bus bar fixing pieces 61, 62 to secure a wide supporting surface, and thereby increase the security in providing support for the bus bars 40, 50. Further, in this embodiment, the bus bar unit 65 can be conveniently assembled by inserting each of the bus bars 40, 50 between the pair of bus bar fixing piece 61, and between the pair of bus bar fixing piece 62. The motor 1 according to this embodiment may also be configured to have a wide area for the opening 69, which is for pulling out each coil end 21a, so that the arcuate portions 82, 85, 88, 89 of the phase bus bar 50A, 50B, 50C are disposed on an outer circumferential edge or on an inner circumferential edge of the bus bar holder 60. With this, the connection process between the coil end 21a and the coil end connection portion 242 may be conveniently performed. It may also be possible to reduce the risk of short-circuiting of the coil end 21a or the coil end connection portion 242. Comparing to a case in which the width direction of the bus bars is perpendicular to the axial direction, it is possible for the motor 1 of this embodiment to have a narrower area for occupying a surface of the bus bar holder 60, since the width direction of the neutral point bus bar 40 and the phase bus bar 50 is identical to the axial direction. Accordingly, the neutral point bus bar 40 and the phase bus bar 50 may be easily arranged with respect to the bus bar holder 60. Also, the connection process between the coil end 21a and the coil end connection portion 242 may be easily performed. Further, it may also be possible to reduce the risk of short-circuiting of the coil end 21a or the coil end connection portion 242.

First Modification

Figure 15:
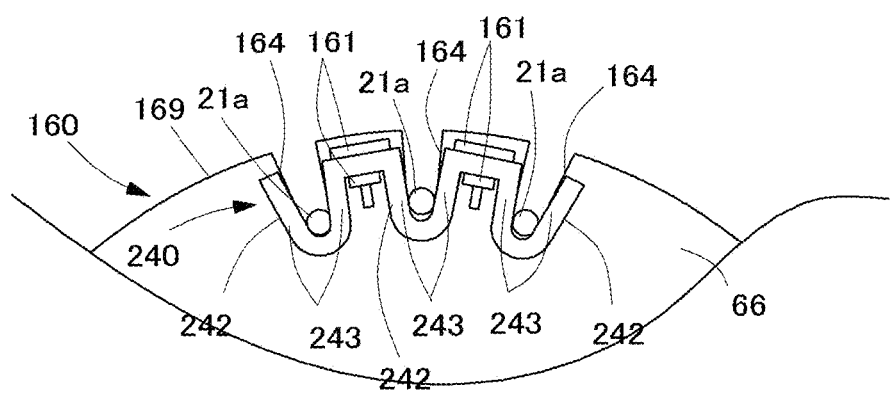
FIG. 15 illustrates a neutral point bus bar and a bus bar holder according to a first modification.

Herein, a neutral point bus bar 240 and a bus bar holder 160 of a first modification, which are applicable to the motor 1 of this embodiment, will be described with reference to FIG. 15. FIG. 15 is a top view illustrating a portion of the neutral point bus bar 240 and the bus bar holder 160 which are applicable to the motor 1. When compared to the first embodiment, a difference in the neutral point bus bar 240 of the first modification is that the coil end connection portion 242 is open toward a different direction. Also, when compared to the first embodiment, a difference in the bus bar holder 160 of the first modification is that a notch 164 is provided thereto. Elements that are identical to those of the first embodiment will be designated with identical reference numbers, and detailed explanation of those elements will not be repeated here.

The neutral point bus bar 240 has two main body portions 241, and three coil end connection portions 242. The two main body portions 241 and the three coil end connection portions 242 are alternatively aligned along a length direction. The main body portion 241 of the neutral point bus bar 240 is sandwiched between the coil end connection portions 242. The main body portion 241 is supported by being sandwiched in a thickness direction between the bus bar fixing pieces 161 of the bus bar holder 160.

Each of the coil end connection portions 242 of the neutral point bus bar 240 has a pair of gripping pieces 243. In the pair of gripping pieces 243, the gripping pieces are arranged in parallel to face each other. The coil end connection portion 242 extends radially inward with respect to the main body portion 241, and the gripping pieces 243 are connected to each other on an opposite side from the main body portion 241. The coil connection portion 242 has a U-shape which is open toward a radially outer side. The coil end connection portions 242 grip the coil end 21a at the opening.

The bus bar holder 160 has a disc shape with an opening 169. The opening penetrates the bus bar holder in the axial direction. The bus bar holder 160 is disposed on the front side (−Z side) of the neutral point bus bar 240. The neutral bus bar fixing pieces (bus bar fixing piece) 161 is provided on the rear side (+Z side) surface of the bus bar holder 160. The main body portion 241 of the neutral point bus bar 240 is supported by being sandwiched between the pair of bus bar fixing pieces 161 in a thickness direction.

The bus bar holder 160 has a notch 164 which extends radially outward from the opening 169. The notch 164 penetrates the bus bar holder in the axial direction. The coil end 21a is inserted through the notch 164. When viewed in the axial direction, the notch 164 is provided on a location that overlaps with the coil end connection portion 242 of the neutral point bus bar 240. The notch 164 is open toward the same direction as the opening of the coil end connection portion 242. The notch 164 reaches a deeper radially outer side than the opening of the coil end connection portion 242.

In this modification, the notch 164 is provided to the bus bar holder 160, such that the notch is open toward the same direction as the opening of the coil end connection portion 242. With this, the process of inserting the coil end 21a through the opening of the coil end connection portion 242 can be conducted in the following order. First, the coil end 21a is tilted toward the opening in advance. Then, after assembling the neutral point bus bar 40, the coil end 21a is linearly extended along the axial direction. As a result, the coil end 21a can be conveniently disposed inside the opening of the coil end connection portion 242. When the process is performed in the order described above, the bus bar holder 160 is provided with the notch 164, the bus bar does not interfere with the insertion of the coil end 21a into the coil end connection portion 242. Accordingly, the assembling process can be easily conducted.

Second Modification

Figure 16:
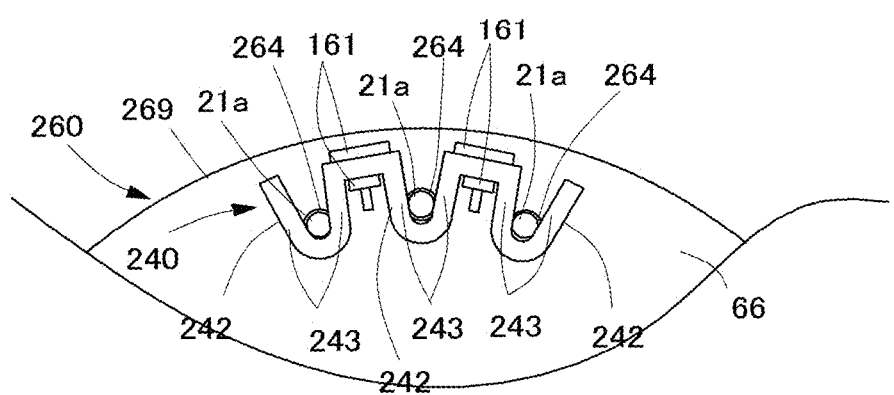
FIG. 16 illustrates a neutral point bus bar and a bus bar holder according to a second modification.

Herein, a bus bar holder 260 of a second modification, which are applicable to the motor 1 of this embodiment, will be described with reference to FIG. 16. FIG. 16 is a top view illustrating a portion of the neutral point bus bar 240 and the bus bar holder 260 which are provided to the motor 1. When compared to the neutral point bus bar 40 of the first modification, a difference is that the coil end connection portion 242 is open toward a different direction. Also, a difference from the first modification is that a through hole 264 is provided to the bus bar holder 260 of the second modification. Elements that are identical to those of the first modification will be designated with identical reference numbers, and detailed explanation of those elements will not be repeated here.

The bus bar holder 260 has a disc shape with an opening 269. The opening 269 penetrates the bus bar holder in the axial direction. The bus bar holder 260 is disposed on the front side (−Z side) of the neutral point bus bar 240. The coil end 21a is inserted into the through hole 264. When viewed in the axial direction, the through hole 264 is provided on a location that overlaps with the coil end connection portion 242 of the neutral point bus bar 240.

The through hole 264 has a diameter that is slightly bigger than the diameter of the coil end 21a. The through hole 264 surrounds the coil end 21a in the circumferential direction, and thereby limits the movement of the coil end 21a. More specifically, the diameter of the through 264 is preferably nearly equal to the size of the diameter of the coil end 21a.

The bus bar holder 260 of this modification is provided with the through hole 264 to limit the movement of the coil end 21a. With this, the coil end 21a is rarely dislocated, and therefore the coil end 21a can be easily inserted into the opening of the coil end connection portion 242 of the neutral point bus bar 240.

Although preferred embodiments and modifications of the present disclosure have been described above, the structures described in the embodiments and the combinations of the elements are merely examples, and therefore addition, omission, substation and other alterations may be appropriately made within the scope of the present disclosure.

For example, in the above-described embodiments, one of the winding beginning end 26a or winding finishing end 26b is disposed on a radially outer side of the stator 20 and the other one is disposed on a radially outer side of the coil 21 of the stator 20, as shown in FIG. 4. However, the winding beginning end and the winding finishing end can be disposed either on a radially inner side or a radially outer side of the stator.

Also, in the above-described embodiments, the bus bars 40, 50 are formed by bending a plate shape member which is in a strip form and has a constant width. However, the width of the bus bar does not necessarily need to be constant. For example, the bus bar may be formed by bending a plate shape member having an L-shape or a T-shape, in which the width is partially made bigger than the rest, along a bending line in the width direction. In this case, it is possible to form a bus bar having a portion protruded in the axial direction. The axially protruded portion may be used as, for example, a terminal.

Features of the above-described preferred embodiments and the modifications thereof may be combined appropriately as long as no conflict arises. While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor, comprising:
a rotor having a shaft which has its center on a center axis extending in one direction;
a stator which surrounds the rotor in the axial circumference, and has a plurality of coils; and
bus bars connecting coil ends extending from the coils,
wherein the bus bars are formed of a plate shape member bent in a thickness direction, a width direction of the bus bars being identical to an axial direction of the motor, and each of the bus bars has a main body portion, and a coil end connection portion which extends from the main body portion and grips one of the coil ends at an opening that is open toward one direction within a plane perpendicular to the axial direction,
a bus bar holder which supports the bus bar,
the main body portion of the bus bar is supported by being sandwiched between a pair of bus bar fixing pieces of the bus bar holder in a thickness direction,
the bus bar fixing piece has a axially extending rib, and among the pair of bus bar fixing pieces, the rib is provided at least to one bus bar fixing piece that is disposed on an opposite side from a direction in which the coil end connection portion of the bus bar is extended.

2. The motor according to claim 1,
wherein, among the bus bars, the main body portion of a phase bus bar extends along a circumferential direction, and has a first end and a second end, the first end being connected with the coil end connection portion and the second end provided with a terminal connection portion, and
the terminal connection portion is electrically connected with a terminal for a connection with an external device.

3. The motor according to claim 1,
wherein the bus bar holder has an axially penetrating notch to which the coil end is inserted, and
when viewed from the axial direction, the notch overlaps with the coil end connection portion of the bus bar, and the opening of the notch is open toward the same direction as the opening of the coil connection portion.

4. The motor according to claim 1,
wherein the bus bar holder has an axially penetrating through hole to which the coil end is inserted, and
when viewed from the axial direction, the through hole overlaps with the coil end connection portion of the bus bar.

5. The motor according to claim 1, further comprising a plurality of bus bars,
wherein the bus bars are disposed such that they do not overlap with one another in the axial direction.

6. The motor according to claim 1,
wherein the bus bar includes a neutral point bus bar and a phase bus bar, the neutral point bus bar being disposed between the terminal connection portions of the phase bus bar which is adjacently aligned in the circumferential direction.

7. The motor according to claim 6,
wherein the neutral point bus bar is disposed on a radially inner side than at least a portion of the main body portion of the phase bus bar, and electrically connected with the coil end.

8. The motor according to claim 1,
wherein one or two coils formed of a single conductive wire forms a coil group, and
one of a winding beginning side or a winding finishing side of the coil group is disposed on a radially outer side, and the other is disposed on a radially outer side.

9. The motor according to claim 1,
wherein the bus bar has a neutral point bus bar for short-circuiting three neutral coil ends from the plurality of coils, and
the neutral point bus bar has two main body portions and three coil end connection portions, the two main body portions and the three coil end connection portions being alternately aligned in a length direction.

10. The motor according to claim 1, further comprising a bus bar holder having a disc shape,
wherein the bus bar holder supports the bus bar, and has a through hole at the center through which the shaft passes, and
an arcuate portion extending in an arc shape is provided to at least a portion of the main body portion, the arcuate portion being disposed on an outer circumferential edge or an inner circumferential edge of the bus bar holder.

11. The motor according to claim 1, further comprising a bus bar holder for supporting the bus bar,
the bus bar holder comprising:
a disc portion;
a through hole provided at the center of the disc portion, such that the shaft passes through the through hole;
an annular portion which surrounds the disc portion from the outer side with a gap therebetween; and
a bridge portion which extends in the radial direction and connects the disc portion with the annular portion,
wherein the main body portion is supported by the annular portion or the bridge portion, and
the coil end connection portion faces an opening which is defined by being surrounded by the disc portion, the annular portion, and the bridge portion.

\* \* \* \* \*